C. W. PARKER.
WIRE WHEEL.
APPLICATION FILED JUNE 3, 1918.

1,298,087.

Patented Mar. 25, 1919.
3 SHEETS—SHEET 1.

Witness

Inventor
Clark W. Parker.
By Pagelsen and Spencer,
Attorney

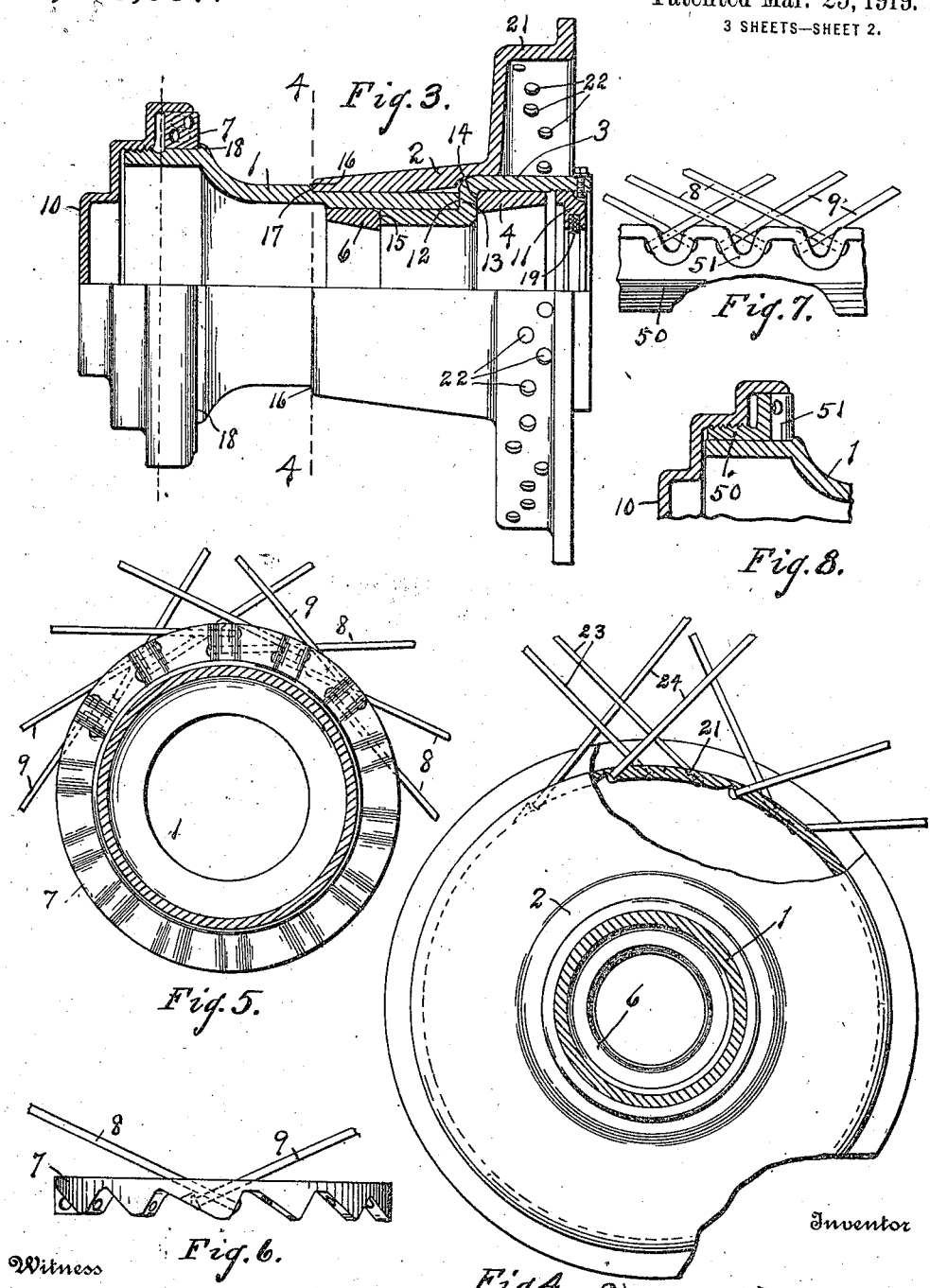

C. W. PARKER.
WIRE WHEEL.
APPLICATION FILED JUNE 3, 1918.

1,298,087.

Patented Mar. 25, 1919.
3 SHEETS—SHEET 3.

Witness

Inventor
Clark W. Parker
By Pagelsen and Spencer,
Attorney

UNITED STATES PATENT OFFICE.

CLARK W. PARKER, OF HIGHLAND PARK, MICHIGAN.

WIRE WHEEL.

1,298,087.  Specification of Letters Patent.  Patented Mar. 25, 1919.

Application filed June 3, 1918. Serial No. 237,884.

*To all whom it may concern:*

Be it known that I, CLARK W. PARKER, a citizen of the United States, and residing at Highland Park, in the county of Wayne and State of Michigan, have invented a new and Improved Wire Wheel, of which the following is a specification.

This invention relates to vehicle wheels having metal hubs formed of a plurality of members fitting into each other, metal felly bands and removable or demountable rims, and wire spokes, and its object is to provide a wheel which shall have maximum strength for its weight, whose spokes are straight and have heads at right angles, and whose felly-band shall be formed with a circular rib to position the rim, which in turn, is entirely supported by a radial flange whose inner edge rests against said rib on the felly-band.

This invention is embodied in a wheel whose hub consists of tubular parts fitting one within the other and formed with shoulders to predetermine the lengths of the various surfaces, one of these parts having a cylindrical portion provided with diagonal holes to receive the inner ends of two series of spokes, these holes being recessed to provide proper seats for the heads of the spokes.

It further consists in securing a ring to the opposite end of the hub which ring has a corrugated outer end and diagonal holes extending in opposite directions from the corrugations to receive the inner ends of two additional series of spokes.

It also consists in a channeled felly-band formed with a circular bead or rib on one of its radial sides to center the demountable rim, and also formed with proper holes in its bottom so that the spokes may extend through the bottom of the channel to receive nuts within the channel.

It further consists in the details of construction illustrated in the accompanying drawings and specifically pointed out in the claims.

Figure 1:
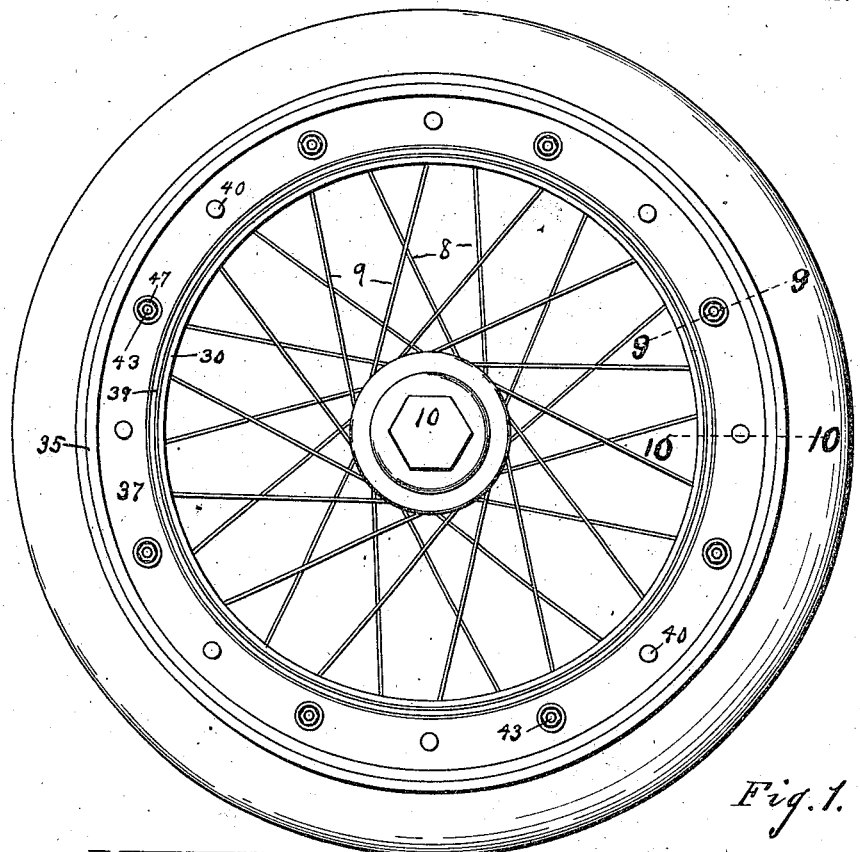
Figure 2:
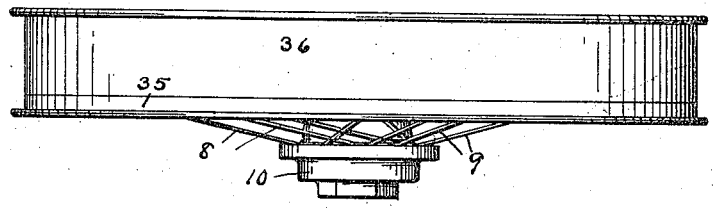
Figure 9:
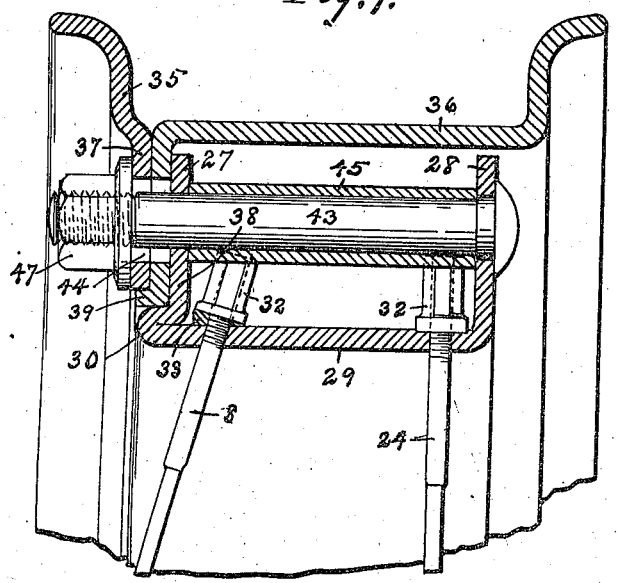
Figure 11:
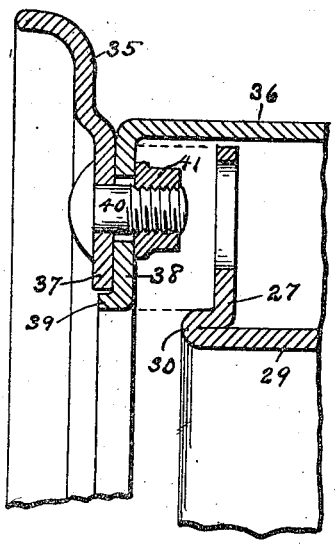
Figure 10:
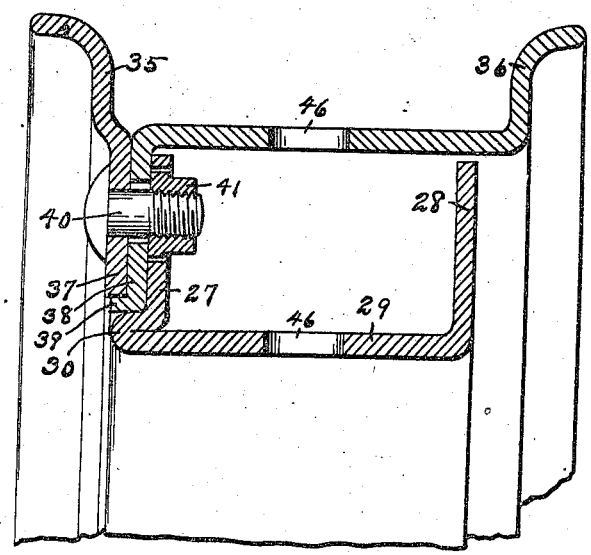

In the accompanying drawing, Figure 1 is a side elevation and Fig. 2 a plan of this improved wheel. Fig. 3 is a view, partly in section and partly in elevation of the hub of this improved wheel. Fig. 4 is a section on the line 4—4 of Fig. 3 looking toward the right. Fig. 5 is a section on the same line looking toward the left. Fig. 6 is a plan of a ring to receive the inner ends of the two groups of spokes. Fig. 7 is a plan of a section of a slightly modified form of this ring. Fig. 8 is a section of this modified form of ring in position. Fig. 9 is a section of the felly-band of this wheel and a rim secured thereto on the line 9—9 of Fig. 1. Fig. 10 is a similar section on the line 10—10 of Fig. 1. Fig. 11 is a similar section showing the rim removed from the felly-band.

Similar reference characters refer to like parts throughout the several views.

The wheel shown in the drawings consists of a hub, four series of spokes and a felly-band. A demountable rim is shown mounted on the wheel but this forms no part of the present invention.

The hub is formed of tubular telescoping parts 1 and 2, within which extends the sleeve 3 carrying one bearing ring 4, while the second bearing ring 6 is mounted in the part 1. A ring 7 is mounted on the part 1 to receive two sets 8 and 9 of spokes, a cap 10 extends over this ring and a dust ring 11 may be mounted in the outer end of the sleeve 3. It will be apparent that any desired type of axle and bearings may be employed. The various parts, excepting the bearing rings 4 and 6, may be pressed from soft tough steel. The part 1 is threaded at one end to receive cap 10 and its opposite or inner end 12 is preferably machined to engage the finished shoulder 13 on the sleeve 3 to thereby accurately position the rings 4 and 6 which are positioned respectively by the finished shoulder 14 and end 15 of this sleeve. The end 16 of the part 2 may also be machined to engage the finished shoulder 17 on the part 1. It is easy to press these parts accurately to any desired diameter but the ends and shoulders should be machined in order to attain accurate lengths. The ring 7 will fit against the shoulder 18 on the part 1. The interior of the outer end of the sleeve 3 will preferably be threaded to receive the dust-ring 11 which carries a small ring 19 of felt or similar material. The parts 1, 2, 3 and 7 are preferably united by spot-welding.

The outer cylindrical flange 21 of the part 2 is provided with holes 22, through which the spokes 23 and 24 extend tangentially in opposite directions. These holes are arranged so as to distribute the stress as much as possible and the inner ends of the holes are recessed so as to furnish proper bearings for the heads on the inner ends of the spokes 23 and 24.

As shown in Figs. 5 and 6 the outer end face of the spoke ring 7 is corrugated and the ring is formed with two sets of holes for the spokes 8 and 9 which extend in opposite directions and at an angle to the general plane of the ring 7. These holes, when necessary, are also recessed to furnish square seats for the heads of the spokes.

The felly-band shown in Figs. 9, 10 and 11 is generally channel shaped having sides 27 and 28 and a bottom 29. A circumferential rib 30 is formed on the outer side 27 toward the outer end of the axle on which the wheel is mounted, to position the rim. The spokes extend through holes in the bottom 29 and have nuts 32 on their outer ends by means of which the rib 30 is properly centered. Small washers 33 may be provided where necessary.

The rim shown in the drawing is in two parts 35 and 36, having radial flanges 37 and 38 respectively of which the latter has a small lip 39 to position the part 35. Bolts 40 are preferably secured in the flange 37 and loose in the flange 38 and the nuts 41 extend through holes in the side 27 of the felly-band. The rim is held in position by bolts 43 secured in proper holes in the felly-band but loose in the holes 44 in the flanges on the rim. Spacers 45 are provided to prevent the felly-band being distorted. The rim and felly-band are provided with holes 46 for the tire-valve tube. The nuts 41 extend into the felly-band so that when the rim is being removed the workman will not mistake these nuts for the nuts 47 on the bolts 43. The rim is centered by the rib 30 and is entirely free from the edges of the sides 27 and 28.

While the spaces between the sides of the felly-band and the rim are sufficient to prevent the rim rusting to the felly-band, these spaces are not sufficient to admit any large amounts of mud to the interior of the band, and any dirt which enters the space between the rim and the side 28 will be crushed and fall out.

In place of a ring 7 to receive the inner ends of the spokes 8 and 9, a ring such as shown in Figs. 7 and 8 may be employed, the ring consisting of a threaded cylindrical portion 50 which may be spot-welded to the outer end of the part 1 of the hub and threaded to receive the cap 10, and a radial flange 51 which will be corrugated and drilled to receive the spokes 8 and 9. The corrugations supply bearing surfaces for the heads of the spokes at right angles to the lines of the spokes.

It will be noticed that no spoke is bent at any point and that they are all stressed longitudinally, thus avoiding the crystallizing to which bent spokes are subjected. As the parts of the hub need machining only at their ends and at the shoulders, the structure may be produced at small cost. No machining except drilling the holes for the spokes is necessary to produce the felly-band so that strong and light wire wheels adapted for demountable rims can be manufactured at low cost.

I claim:—

1. In a vehicle hub, the combination of two telescoping members, the inner provided with internal and external shoulders, a plurality of bearing rings within the hub positioned by the inner member, and a pair of spoke anchoring collars on the hub positioned by the outer member.

2. A vehicle wheel hub consisting of two telescoping tubular members formed with shoulders for determining the length of the hub, a pair of bearing rings within said tubular members and positioned by shoulders thereon, and a pair of collars mounted on said members and positioned by shoulders thereon, said collars being formed with holes to receive spokes and said holes being tangential in opposite directions.

3. A vehicle wheel comprising a hub, a felly-band and straight wire spokes connecting them, said hub consisting of outer, inner and intermediate telescoping tubular parts and formed with shoulders to determine the length of the hub, the outer member of the hub being provided with a cylindrical flange formed with holes to receive the inner ends of a portion of the spokes, and a ring mounted on the intermediate member of the hub and provided with holes to receive the inner ends of the remaining spokes, all of said holes being in direct alinement with other holes in the felly-band.

4. In a vehicle hub, the combination of two telescoping tubular members the inner member being formed with a shoulder to determine the length of the hub, a pair of spoke anchoring collars on the ends of said hub, said outer tubular member being formed with shoulders to determine the position of said collars.

5. In a vehicle hub, the combination of two telescoping tubular members, the inner member being provided with internal and external shoulders, the external shoulder serving to determine the length of the hub, and a pair of bearing rings mounted within the hub and positioned by the internal shoulders on the inner tubular member.

6. In a vehicle hub, the combination of two telescoping tubular members formed with external shoulders, the inner member being formed with one shoulder to engage the inner end of the outer member to determine the length of the hub, a pair of spoke anchoring collars on said hub, one of said collars being positioned by a shoulder on the outer tubular member and the other collar being positioned between shoulders on both of said members.

7. In a vehicle hub, the combination of an outer tubular member and an inner tubular member extending into it, said inner member being provided with an internal and an external shoulder, a bearing ring within the inner member and engaging the shoulder therein, a second bearing ring within the outer member and engaging the end of the inner bearing member, a collar formed with two series of tangential holes mounted on the outer end of the outer tubular member, and a second collar formed with two series of tangential holes mounted on both the inner and outer tubular members.

8. A vehicle wheel hub consisting of two telescoping tubular members formed with engaging surfaces for determining the length of the hub, collars on the outer ends of said hub and positioned by shoulders thereon, said collars having holes to receive spokes, one of said collars being corrugated and having its holes substantially tangential.

CLARK W. PARKER.